US012443479B2

(12) United States Patent
Bober et al.

(10) Patent No.: US 12,443,479 B2
(45) Date of Patent: Oct. 14, 2025

(54) MANAGING OPERATIONAL FUNCTIONALITY OF FAR EDGE DEVICES USING LOG DATA

(71) Applicant: Dell Products L.P., Round Rock, TX (US)

(72) Inventors: Roman Bober, Ashdod (IL); Maxim Balin, Gan-Yavne (IL); Stav Sapir, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 18/359,470

(22) Filed: Jul. 26, 2023

(65) Prior Publication Data

US 2025/0036516 A1 Jan. 30, 2025

(51) Int. Cl.
*G06F 11/07* (2006.01)
(52) U.S. Cl.
CPC ...... *G06F 11/0793* (2013.01); *G06F 11/0709* (2013.01); *G06F 11/079* (2013.01)
(58) Field of Classification Search
CPC . G06F 11/0793; G06F 11/0709; G06F 11/079
USPC .......................................................... 714/2
See application file for complete search history.

(56) References Cited

U.S. PATENT DOCUMENTS

| 2004/0153823 | A1* | 8/2004 | Ansari | G06F 11/0793 |
| | | | | 714/38.14 |
| 2014/0173687 | A1* | 6/2014 | Dimitrakos | G16H 10/60 |
| | | | | 726/1 |

\* cited by examiner

*Primary Examiner* — Yair Leibovich
(74) *Attorney, Agent, or Firm* — WOMBLE BOND DICKINSON (US) LLP

(57) ABSTRACT

Methods and systems for managing data processing systems that provide computer-implemented services are disclosed. A data processing system (e.g., device) may include and depend on the operation of its hardware and/or software components in order to provide the computer-implemented services. To manage the operation of a device, a device manager may obtain log data (e.g., sequences of log messages) for the components of the device that reflect the operational activity of the device and/or its components. The log data may be analyzed automatically (e.g., in real-time), using a repository of known log data sequences, to identify operational issues and/or corresponding responses to the operational issues. The responses may include compensatory and/or correctional actions for remediation of the operational issues. The automated methods may provide an efficient and cost-effective method for managing device operational issues that may reduce the likelihood of the device becoming impaired and/or interruptions in the computer-implemented services.

20 Claims, 5 Drawing Sheets

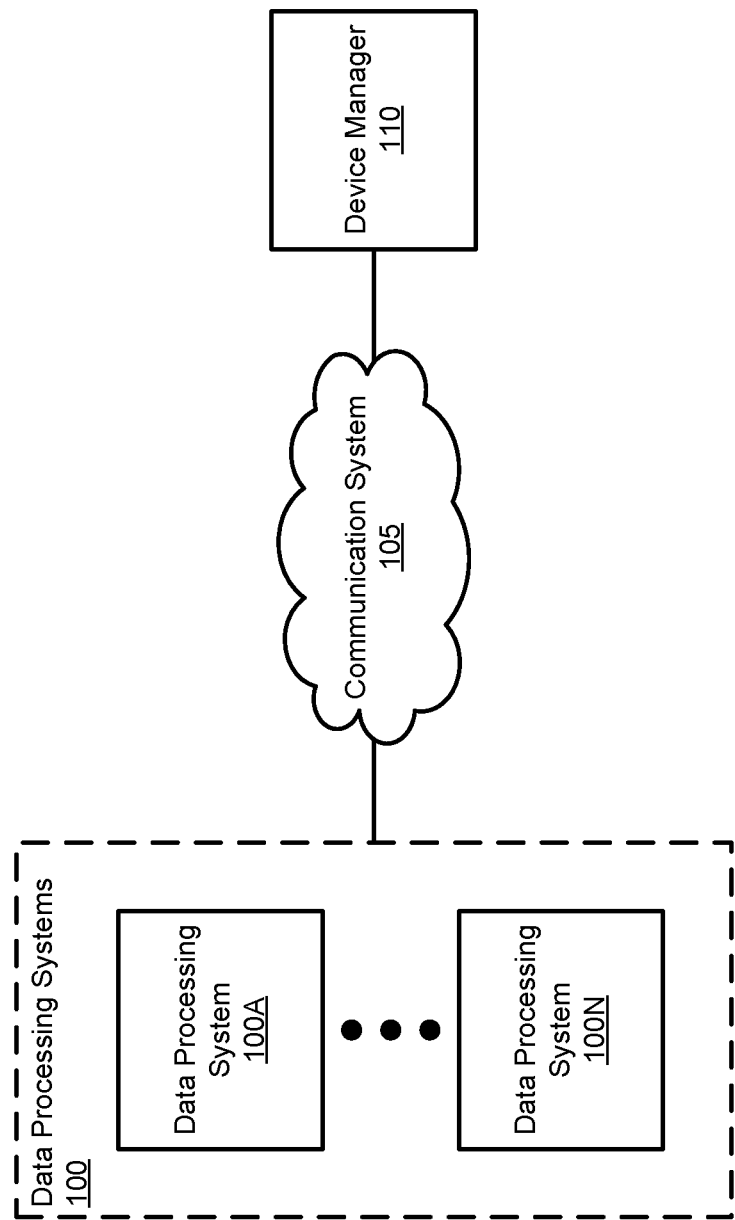

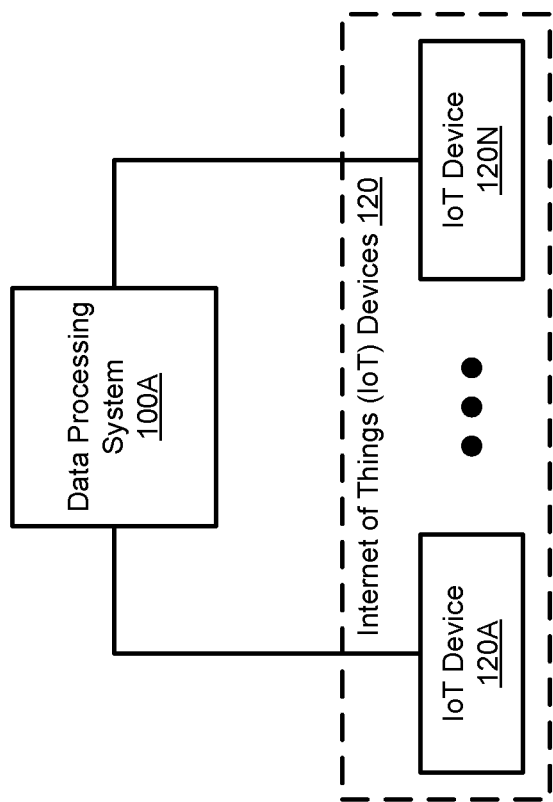

MANAGING OPERATIONAL FUNCTIONALITY OF FAR EDGE DEVICES USING LOG DATA

FIELD

Embodiments disclosed herein relate generally to device management. More particularly, embodiments disclosed herein relate to systems and methods to manage the operation of devices through log analysis.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with an embodiment.

FIG. 1B shows a data flow diagram illustrating a system of interrelated devices in accordance with an embodiment.

DETAILED DESCRIPTION

Figure 2:
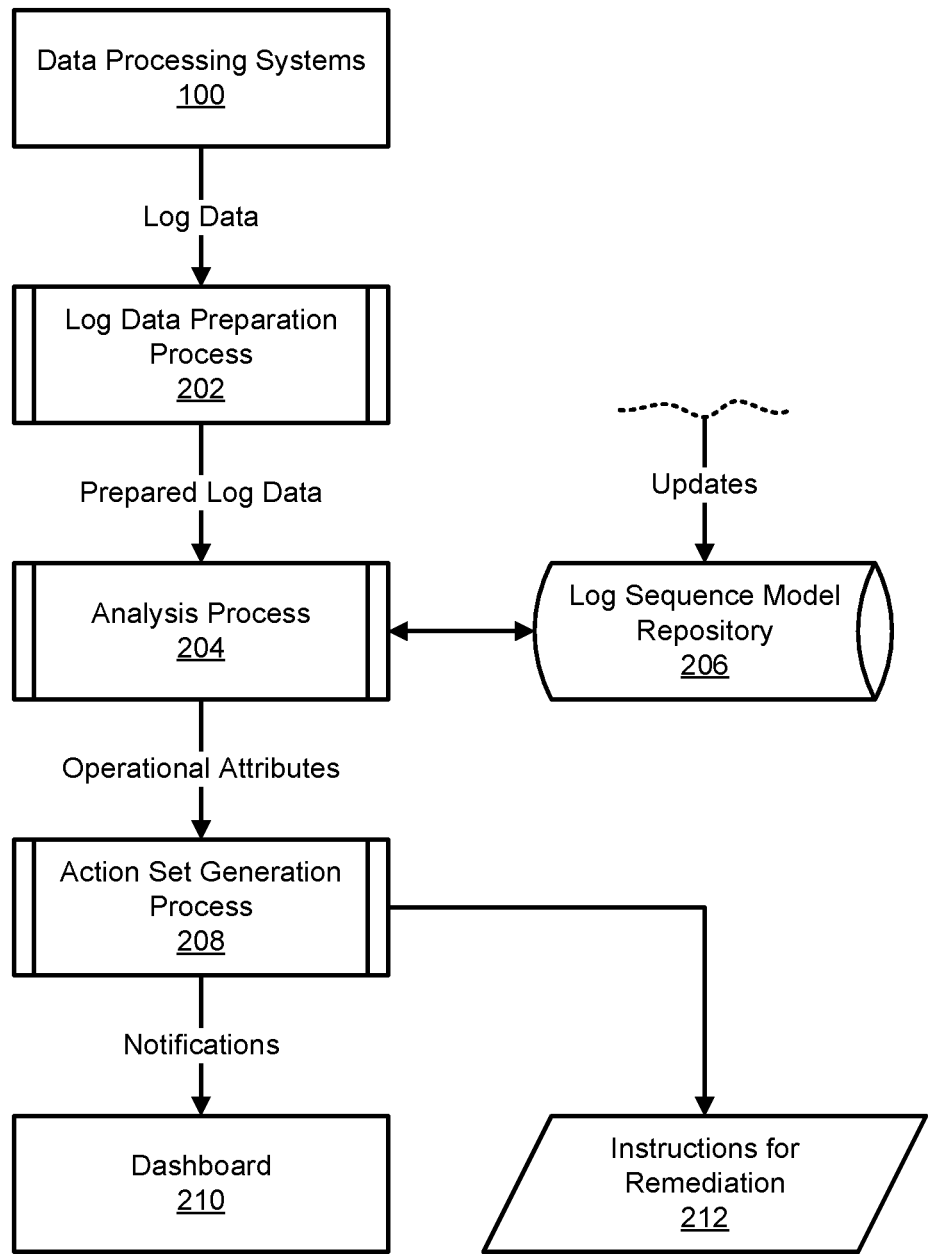
FIG. 2 shows a data flow diagram illustrating a process for managing a disruption in computer-implemented services provided by data processing systems in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems (e.g., devices) that provide computer-implemented services. A data processing system may include one or more hardware and/or software components. The operation of the data processing system may depend on the operation of these components. For example, improper operation of any of these components may impair the operation of (e.g., reduce performance of, reduce functionality of, etc.) the data processing system. For data processing systems (e.g., devices) providing computer-implemented services (e.g., to downstream consumers), improper and/or undesired operation of the components of the data processing system may lead to a reduction in quality of and/or cessation of the computer-implemented services.

To manage the operation of the data processing system, the system may include a data processing system manager (e.g., a device manager). The device manager may obtain log data for data processing systems reflecting the operation of these data processing systems directly from the data processing system. However, in some cases, the device manager may obtain log data for a far edge device such as an internet of things (IoT) device that may rely on data transmission channels facilitated by an edge device (e.g., a data processing system) operating as a gateway.

Current (e.g., real-time) log data representing current activity of IoT devices may be used to monitor the current operation (e.g., level of functionality, security status, etc.) of the IoT devices, and/or to provide other functions. For example, log messages indicating activity of a device may be monitored (e.g., read) and/or interpreted by an administrator of the device. If the log messages indicate undesired operation of the device, then the administrator may generate and/or initiate an action set in order to remediate the undesired operation.

However, large volumes of real-time log data may be collected (e.g., representing large numbers of active devices and components thereof, etc.), which may be difficult to manage and/or analyze efficiently (e.g., in real-time). For example, large volumes of log data may include large amounts of irrelevant and/or redundant information (e.g., log messages), making it challenging and/or time-consuming to manually identify log messages that may indicate undesired operation of a device. This may lead to (i) missed indications of undesired operational activity, (ii) untimely identification and/or remediation of the undesired operational activity, and/or (iii) inappropriate remedial responses to the undesired operation (e.g., an action set generated by and/or initiated by an unskilled administrator).

Therefore, to improve the efficiency of the identification of operational issues in large numbers of (far edge) devices, automated methods of log data analysis may be implemented. The automated methods may function in real-time and may perform an analysis of prepared log data by automatically referencing a repository of known log sequences (e.g., one or more log messages). When a known log sequence is identified in the log data, a corresponding operational condition (e.g., operational issue) and/or response may be automatically identified. The response may be used to generate timely and/or appropriate remedial responses that, when performed, may reduce negative outcomes of the operational conditions (e.g., that may negatively affect the computer-implemented services provided by the far edge devices). The action sets may include corrective action (e.g., which may modify the operation of the far edge devices themselves) and/or compensatory action (e.g., which may modify the operation of edge devices facilitating network communication for the far edge devices).

By doing so, embodiments disclosed herein may provide a system for managing data processing systems that provide computer-implemented services by automating (i) the analysis of log data (e.g., of the data processing systems), (ii) the identification of operational status (e.g., of the data processing systems), (iii) the generation of remedial responses (e.g., to the operational status), and/or (iv) the initiation of remedial responses (e.g., by other data processing systems connected to the data processing systems as members of a data pipeline).

Thus, an improved computing device and/or distributed system may be obtained. The improved device and/or system may be more resilient to impairment, which may result in an improved reliability of computer-implemented services (e.g., provided by one or more members of the distributed system).

In an embodiment, a computer-implemented method for managing data processing systems that provide computer-implemented services is provided. The method may include: obtaining log data for a data processing system of the data processing systems, the log data including log messages that indicate activity of the data processing system during a period of time, the activity indicating a disruption in the computer-implemented services; and, analyzing the log data using a log sequence model repository to attempt to identify a corresponding log sequence model from the log sequence model repository.

In a first instance of the analyzing where no corresponding log sequence model is identified, the method may include: identifying that the log data includes an unknown sequence of the log messages; initiating analysis of the unknown sequence of the log messages to obtain an update for the log sequence model repository; and, deploying the update to the log sequence model repository.

In a second instance of the analyzing where the corresponding log sequence model is identified, the method may include obtaining additional instructions based on the corresponding log sequence model, and updating operation of at least one of the data processing systems using the additional instructions to obtain updated data processing systems that correct for the disruption in the computer-implemented services.

The additional instructions may include corrective action or compensatory action. The corrective action may modify operation of the data processing system to mitigate the disruption in the computer-implemented services. The compensatory action may modify operation of a second data processing system to mitigate the disruption in the computer-implemented services.

The compensatory action may include identifying a functionality of the data processing system impacted by the disruption in the computer-implemented services, and using a second functionality of the second data processing system to correct for the impacted functionality of the data processing system.

The second data processing system may be a member of a data pipeline implemented using the data processing system and the second data processing system, and the second data processing system may be positioned in the data pipeline to obtain data generated by the data processing system.

The data processing system may be an internet of things device operably connected to the second data processing system, and the second data processing system may be an edge device that operates as a gateway for the internet of things device.

Obtaining the additional instructions based on the corresponding log sequence model may include identifying a response associated with the corresponding log sequence model, the response specifying the additional instructions. Obtaining the additional instructions based on the corresponding log sequence model may further include updating a dashboard based on the corresponding log sequence model, the dashboard being adapted to present status information regarding the data processing systems to an administrator of the data processing systems.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services and may be managed by a data processing system manager (e.g., device manager 110) in order to provide the computer-implemented services. The system may include data processing systems 100. Data processing systems 100 may include any number of computing devices that provide the computer-implemented services. For example, data processing systems 100 may include one or more data processing systems 100A, 100N that may independently and/or cooperatively provide the computer-implemented services.

The computer-implemented services may be performed, in part, by using AI models (e.g., inference models). The inference models may, for example, be implemented with artificial neural networks, decision tress, regression analysis, and/or any other type of model usable for learning purposes. For example, data obtained from various data sources (not shown) may be used as training data (e.g., used to train the inference models to perform the computer-implemented services), and/or as ingest data (e.g., used as input to the trained inference models in order to perform the computer-implemented services).

The computer-implemented services may include any type and quantity of services including, for example, database services, instant messaging services, video conferencing services, etc. Different systems may provide similar and/or different computer-implemented services. To provide the computer-implemented services, data processing systems 100 may host applications that provide these (and/or other) computer-implemented services. The applications may be hosted by one or more of data processing systems 100. For example, all, or a portion, of data processing systems 100A-100N may provide computer-implemented services to downstream consumers such as users and/or other computing devices (e.g., a system of interrelated devices) operably connected to data processing systems 100.

Turning to FIG. 1B, a data flow diagram illustrating a system of interrelated devices in accordance with an embodiment is shown. The system of FIG. 1B may include any number of IoT devices 120 (e.g., 120A-120N), which may be operably connected to one or more edge devices (e.g., data processing system 100A of data processing systems 100). Any of IoT devices 120 may collect, generate, process, and/or provide data to the one or more edge devices in order to facilitate the provision of computer-implemented services (e.g., to a downstream consumer and/or another device).

One or more of IoT devices 120 may provide primary computer-implemented services that may be provided to downstream consumers and/or to other devices operated by the downstream consumers. IoT device 120A may include sensors, gadgets, appliances and/or other machines that collect and exchange data over the Internet (e.g., via data processing system 100A). For example, IoT device 120A may include a smartwatch that may collect (e.g., from the smart watch user), process, and/or exchange data (e.g., via an edge device such as data processing system 100A) in order to provide the primary computer-implemented services.

When operating, devices (e.g., any of IoT devices 120A-120N and/or data processing systems 100) and/or their components may generate log data (e.g., one or more operational logs). A log may refer to a data structure that includes a representation of current and/or past operation of all or a portion of a data processing system or device. For example, log data generated by and/or collected from IoT devices 120 may include log messages (e.g., portions of the log) that indicate activity of the IoT devices 120 during a period of time. The log data may include descriptions of device and/or device component functionality such as (i) conditions encountered by a component (e.g., of a device), (ii) a time when the condition was encountered, (iii) an identifier associated with a condition and/or a generator of the log (e.g., the device), (iv) an indication of a relative level of importance or severity of the encountered conditions, and/or (v) other types of information.

IoT device 120A may also provide secondary computer-implemented services that, for example, may facilitate device management services that may include transmitting data to other devices (e.g., managing devices). For example, IoT device 120A may provide secondary computer-implemented services by collecting, generating, and/or transmitting log data (e.g., of IoT device 120A) via an edge device such as data processing system 100A. Data processing system 100A may include functionality to transmit the log data through a network (e.g., the Internet) in order to stream the log data (and/or other data) to an edge control plane (e.g., managed by a device manager).

Any of IoT devices 120, data processing systems 100, and components thereof, as well as hosted entities (e.g., applications that help provide computer-implemented services), may be subject to undesired operation. For example, due to various operating conditions, flaws in design, and/or for other reasons, any of these hardware and/or software components may operate in a manner that diverges from nominal (e.g., desired) operation. For example, undesired operation of a device may include operational issues such as (i) a loss of functionality of one or more hardware and/or software components of a device (e.g., IoT devices 120), (ii) security issues (e.g., unauthorized access to the device and/or data provided by the device), and/or (iii) other issues affecting the computer-implemented services facilitated by the device.

While the log data of a device (e.g., IoT devices 120, data processing systems 100) may include information regarding the current operation of the devices, the logs may not directly specify whether one or more log messages (e.g., log segments) are indicative of undesired operation of the devices and/or components thereof. Therefore, in order to identify operational issues (e.g., a full or partial loss of functionality, suspicious operational behavior indicative of security issues, etc.), for example, of IoT devices 120, the logs of IoT devices 120 may be monitored and/or analyzed (e.g., by a user, such as an administrator).

However, large volumes of log data may be continuously collected from a large number of devices; therefore, timely and/or proper analysis of these large volumes of log data (e.g., by one or more users) may be infeasible and/or costly (e.g., due to human resource costs). Further, upon identifying an operational issue (e.g., based on the analysis of the large volumes of log data), the user alone may lack knowledge and/or information usable to efficiently manage (e.g., remediate) the operational issue.

Therefore, in order to identify and/or address operational issues of one or more devices (e.g., IoT devices 120 and/or data processing systems 100) in an efficient and cost-effective manner, the large volumes of log data collected from the one or more devices may be analyzed (e.g., in real-time) using automated methods of operational issue detection. Additionally, automated methods of remediation may be implemented, for example, via automatic generation of instructions for corrective and/or compensatory action that may prevent and/or mitigate the operational issues and/or outcomes of the operational issues.

In general, embodiments disclosed herein may provide systems, devices, and/or methods for managing IoT and/or edge devices that may be subject to undesired operation that may negatively affect the computer-implemented services provided by the devices (e.g., cause a reduction in quality and/or functionality of the computer-implemented services).

Returning to FIG. 1A, a system in accordance with an embodiment may include device manager 110. Device manager 110 may manage the operation of data processing systems 100 and/or IoT devices 120 operably connected to one or more of data processing systems 100 (as described with respect to FIG. 1B).

To provide its functionality, device manager 110 may (i) obtain log data for hardware and/or software components of data processing systems 100 and/or devices operably connected to data processing systems 100 (e.g., of IoT devices 120), (ii) prepare the log data (e.g., based on a predetermined schema) for storage and/or analysis, (iii) initiate analysis of and/or analyze the prepared log data to identify an operational condition (e.g., using a repository of modeled log data and corresponding remedial responses), (iv) generate an action set based on the analysis (e.g., a corresponding remedial response to an operational issue), and/or (v) generate and/or provide a notification (e.g., to an administrator via a dashboard accessible to the administrator) regarding the operational issue and/or instructions for mitigating (e.g., correcting or compensating for) the operational issue.

For example, an IoT device such as a smartwatch may collect and process (e.g., modify, transform, etc.) data. The processed data may be shared to an edge device (e.g., operating as a gateway for the smartwatch) that may include functionality for forwarding the processed data to another device (e.g., of a cloud service) for further analysis as part of the computer-implemented services provided by the smartwatch. However, one or more processing steps typically performed by the smartwatch may be non-functional, resulting in partially processed data. The partially processed data may be unsuitable for further analysis, which may result in an interruption the computer-implemented services provided by the smartwatch. Therefore, through automated log analysis (e.g., of smartwatch log data), operational issue(s) may be identified (e.g., the one or more processing steps that were not performed may be identified), and an action set may be generated based on the identified operational issue (s).

The generated action set may include providing a notification to a dashboard that may be monitored by one or more users (e.g., administrators), and/or generating instructions (e.g., for the edge device) for compensatory action and/or corrective action. For example, corrective action may include performing an action that returns the loss of functionality to the smartwatch, such as a software update and/or a modification to configuration settings of the smartwatch. Compensatory action may include modifying the functionality of the edge device operating as a gateway for the smartwatch. The modified functionality may include intercepting the partially processed data in order to perform the one or more processing steps not performed by the smartwatch before forwarding the resulting processed data to the cloud service.

By doing so, a system in accordance with embodiments disclosed herein may provide IoT devices and/or data processing systems having, for example, (i) decreased downtime (e.g., downtime due to full or partial loss of functionality), (ii) improved user experiences by avoiding phantom slowdowns and/or pauses (e.g., due to undesired operating behavior), and/or (iii) decreased resource spending (e.g., on human resources) due to the automation of device monitoring (e.g., using human resources only for a portion of operational issues that may benefit from human intervention).

Figure 3:
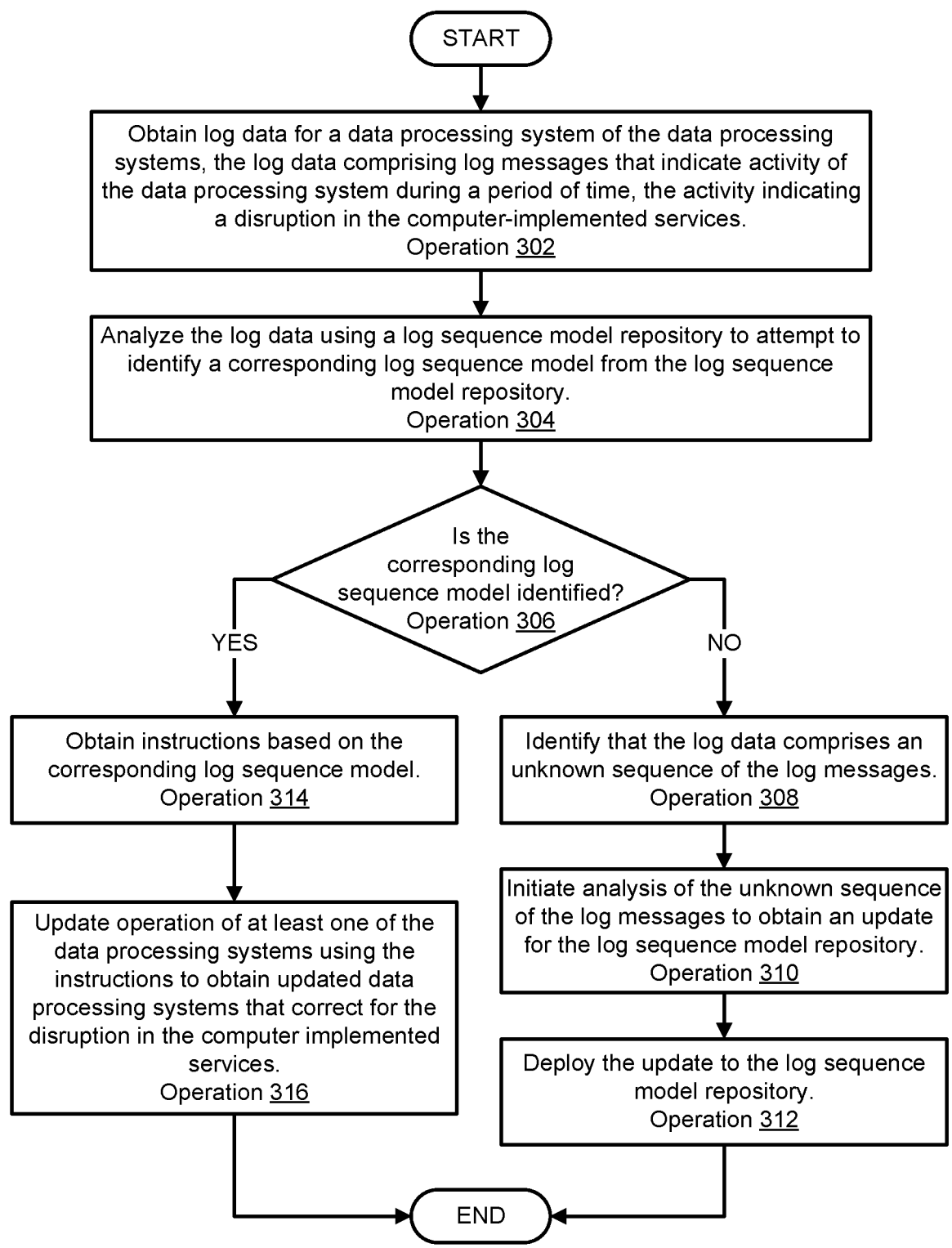
FIG. 3 shows a flow diagram illustrating a method for managing a disruption in computer-implemented services provided by data processing systems in accordance with an embodiment.

When providing its functionality, data processing systems 100, device manager 110, and/or IoT devices 120 may perform all, or a portion, of the method and/or actions shown in FIG. 3.

Data processing systems 100, device manager 110, and/or IoT devices 120 may be implemented using a computing device such as a host or server, a personal computer (e.g., desktops, laptops, and tablets), a "thin" client, a personal digital assistant (PDA), a Web enabled appliance, or a mobile phone (e.g., a smartphone), an embedded system, local controllers, and/or any other type of data processing device or system. For additional details regarding computing devices, refer to FIG. 4.

In an embodiment, one or more of data processing systems 100, device manager 110, and/or IoT devices 120 are implemented using an IoT device, which may include a computing device. The IoT device may operate in accordance with a communication model and/or management model known to data processing systems 100, device manager 110, IoT devices 120, downstream consumers (not shown), and/or other devices.

Any of the components illustrated in FIGS. 1A-1B may be operably connected to each other (and/or components not illustrated) with a communication system 105. In an embodiment, communication system 105 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIGS. 1A-1B as included a limited number of specific components, a system in accordance with an embodiment may include fewer, additional, and/or different components than those illustrated therein.

As discussed, the system described in FIGS. 1A-1B may be used to obtain and/or analyze log data of edge device (e.g., IoT device) in order to identify an operational issue of the edge device and a corresponding response to the operational issue. Based on the response, the system of FIGS. 1A-1B may automatically generate an action set which may include (i) notifying a user (e.g., an administrator of the edge device) of the identified operational issue (e.g., via a dashboard), and/or (ii) generating instructions (e.g., for a data processing system that may operate as a gateway for the edge device) for remediating the operational issue, such as instructions for corrective action and/or compensatory action.

The processes shown in FIG. 2 may be performed by any entity shown in the systems of FIGS. 1A-1B (e.g., a data manager similar to device manager 110, a data processing system similar to data processing system 100A, etc.) and/or another entity without departing from embodiments disclosed herein.

Turning to FIG. 2, a data flow diagram in accordance with an embodiment is shown. The data flow diagram may illustrate a process for managing a disruption in computer-implemented services provided by data processing systems. To do so, the disruption may be identified using a log data preparation process and/or an analysis process.

Log data preparation process 202 may obtain (e.g., in real-time) log data from one or more of data processing systems 100 (e.g., managed by device manager 110). The log data may include any type and/or quantity of log data (e.g., any number of log files including any number of log messages). The log data may include descriptions of activity of one or more of data processing systems 100, one or more devices (e.g., IoT devices 120) operably connected to data processing systems 100, and/or components thereof. For example, the log sequences (e.g., one or more log messages) of the log data may include log sequence patterns that may indicate operational functionality such as normal operation (e.g., full functionality) and/or undesired operation (e.g., partial functionality).

The log data collected by log data preparation process 202 may be implemented with structured or unstructured data; therefore, the collected log data may be processed through a data pipeline which may include data normalization (e.g., standardizing collected log data based on a schema compatible for storage in a relational database) and/or other data processing. For example, unstructured log data may be cleaned and/or transformed (e.g., reorganized, redundancy edited, etc.) to produce structured log data and/or different formats of collected structured log data may be transformed (e.g., reorganized, reformatted, etc.) in order to produce standardized log data (e.g., based on the predetermined schema). The standardized log data may include tabular data with columns and rows that define attributes of the log data (e.g., extracted during the normalization and/or processing of the collected log data).

As part of log data preparation process 202, the collected log data may be classified and/or enriched, for example, by adding attributes and/or data tags (e.g., adding metadata fields) to the collected log data and/or other methods of data enrichment that may improve the future usability (e.g., searchability) of the log data. For example, data tags may be added by a user and/or by an inference model trained to label the log data.

Log data attributes may include, for example, (i) portions of log messages of the log data (e.g., key words and/or numeric identifiers extracted from the log messages), (ii) time stamps of the portions of the log messages, (iii) information regarding the source of the log data (e.g., IoT device identifiers), (iv) information regarding data processing systems that may have forwarded the log data from the source (e.g., gateway and/or edge device identifiers), and/or (v) information from data tags (e.g., added by users and/or inference models).

Once the collected log has been normalized, processed, enriched, etc., log data preparation process 202 may provide the prepared log data to a prepared log data repository (not shown) where it may be stored. The prepared log data repository may be managed using a database, which may be queried (e.g., manually by users and/or automatically by data processing systems) using key words that may match one or more log data attributes, metadata tags, etc. The prepared log data may also be provided (e.g., in real-time) to analysis process 204.

Analysis process 204 may obtain prepared log data from log data preparation process 202. The prepared log data may include one or more log sequences describing the operation of one or more devices (e.g., managed by device manager 110), along with log data attributes (e.g., log data attributes extracted from and/or added to the prepared log data during log data preparation process 202). Analysis process 204 may attempt to identify one or more log sequence models (e.g., using a log sequence model repository) that correspond with the one or more log sequences of the prepared log data.

A log sequence model may refer to a log sequence (e.g., a log message and/or a sequence of log messages) for which operational attributes are known. For example, operational attributes associated with a log sequence model may include (i) an operational condition (e.g., normal operation or undesired operation that may lead to a disruption), (ii) outcomes of the operational condition (e.g., the disruption and/or associated risk levels), and/or (iii) default responses to the outcomes of the operational condition (e.g., instructions for preventing and/or mitigating a negative outcome of an operational issue).

The log sequence model and associated operational attributes may be based on a previous analysis of historical log data of devices and their corresponding historical operational attributes. The historical log data may be prepared for analysis using a process similar to log data preparation process 202, where the historical log data may be normalized, and/or log data attributes may be generated (e.g., extracted and/or added) before the historical log data is analyzed.

The analysis of historical log data may include associating (e.g., labeling) portions of the log data (e.g., log sequences) with operational attributes (e.g., historical operational conditions that occurred in the same time period as the log sequence time stamp information, historical outcomes of the historical operational conditions (e.g., disruptions of services), and/or historical responses that have demonstrated the prevention and/or mitigation of negative historical outcomes). The analysis and/or labeling of historical log data may be performed, for example, by a user (e.g., subject matter experts, administrators, etc.) and/or using automated methods (e.g., an inference model trained to classify or label log sequences with operational attributes).

The log sequences models (with associated log data attributes and/or operational attributes) may be stored in a repository such as log sequence model repository 206. Log sequence model repository 206 may be managed using a relational database (e.g., which may be queried based on key words corresponding to log data attributes). Log sequence model repository 206 may be accessible to analysis process 204. Analysis process 204 may use key words (e.g., based on log data attributes) of the prepared log data to identify a corresponding log sequence model stored in log sequence model repository 206.

The corresponding log sequence model may match a log sequence of prepared log data (e.g., based on one or more log data attributes). For example, the log sequence of the prepared log data may be the same as or similar to (e.g., within a threshold) the log sequence model. Once the log sequence model is identified, the log sequence model and its associated operational attributes may be obtained by analysis process 204.

However, a corresponding log sequence model may not be identified, which may prompt analysis process 204 to flag the log sequence (of the prepared log data) as unknown. Unknown log sequences may be further analyzed (e.g., by subject matter experts) in an additional process (not shown) in order to identify operational attributes corresponding to the unknown log sequence. Log sequence model repository 206 may receive updates (e.g., from the subject matter experts) when operational attributes of unknown log sequences are identified.

Therefore, analysis process 204 may provide corresponding log sequence models and/or associated operational attributes of devices to action set generation process 208. Using the log sequence models and associated operational attributes of the devices, action set generation process 208 may obtain and/or generate instructions for remediation 212. Instructions for remediation 212 may be implemented in an effort to mitigate a disruption (e.g., caused by identified operational issues) in computer-implemented services provided by the devices.

Instructions for remediation 212, when executed, may include corrective action and/or compensatory action. Instructions for remediation 212 may include instructions executable by a data processing system (e.g., in order to automate the remediation). Instructions for corrective action may include instructions that, when executed, modify the operation of the device experiencing the operational issue in order to mitigate the disruption. For example, corrective action may include modifying one or more configuration settings of the device and/or modifying the device software (e.g., via a software update). The corrective action may be implemented automatically and/or via a notification (e.g., prompt) to the user of the device.

Instructions for compensatory action may include instructions that, when executed, modify the operation of a second device in the same data pipeline as the device experiencing the operational issue (e.g., an edge device operating as a gateway for the device). For example, a functionality of the device impacted by the operational issue (e.g., the disruption of computer-implemented services) may be identified. Based on the identified lack of functionality of the device, the second device may receive instructions for compensatory action (e.g., adding additional functionality to the second device) that may correct for the lack of functionality of the device and/or mitigate the disruption.

Action set generation process 208 may also use the obtained log sequence models and associated operational attributes of the devices obtain, generate, and/or provide notifications a dashboard (e.g., dashboard 210), which may be used by administrators to monitor activity (e.g., operational issues) of the devices.

The notifications provided to dashboard 210 may include (i) information regarding the log sequence obtained from the device (e.g., whether the log sequence is known or unknown, log data attributes of the log sequence, etc.), and if the log sequence is known, (ii) information regarding the corresponding log sequence model (e.g., a likelihood that the log sequence matches the corresponding log sequence model), (iii) information regarding the operational condition of the device (e.g., normal operation, undesired operation, and/or suspicious operation), (iv) information regarding the expected outcome (e.g., loss of functionality of the device, device security issues, a risk level of the outcome, etc.), (v) information regarding the response to the outcome (e.g., instructions for remediation, a human-readable summary of the response, whether the response requires human intervention, etc.), and/or (vi) other information associated with the device, its current operation, and/or the outcome of the current operation.

Dashboard 210 may obtain notifications from action set generation process 208 and/or may be adapted to present status information regarding the devices (e.g., data processing systems) to an administrator. Dashboard 210 may include, for example, filtering functionality, which may allow the administrator to filter information displayed by dashboard 210 based on a level of risk (e.g., of the outcome) and/or response type so that only critical operational issues requiring human intervention may be displayed. By doing so, the user (e.g., administrator) may prioritize resources (e.g., human resources and/or computing resources) for critical operational issues, which may increase the likelihood of maintaining the provision of computer-implemented services provide by the devices.

Thus, as illustrated in FIG. 2, the system described with respect to FIGS. 1A-1B may identify operational conditions of devices providing computer-implemented services based on the analysis of log data of the devices. The analysis may be performed as log data is collected from the devices and actions for remediation of the operating conditions may be automatically implemented based on the analysis, mitigating disruptions to the computer-implemented services. The automated detection and/or remediation of operational issues among data processing systems may increase the efficiency of and/or improve the allocation of resources for data processing system management.

As discussed with respect to FIGS. 1A-1B, improper operation of one or more components of a device may lead to disruptions in computer-implemented services provided by the device. Thus, as illustrated in FIG. 2, the system of FIGS. 1A-1B may address operational issues of the one or more components which may cause the disruptions using automated analysis and remediation processes.

In an embodiment, the one or more entities performing the operations shown in FIG. 2 are implemented using a processor adapted to execute computing code stored on a persistent storage that when executed by the processor performs the functionality of the system of FIGS. 1A-1B discussed throughout this application. The processor may be a hardware processor including circuitry such as, for example, a central processing unit, a processing core, or a microcontroller. The processor may be other types of hardware devices for processing information without departing from embodiments disclosed herein.

FIG. 3 illustrate methods that may be performed by the components of FIGS. 1A-1B. In the diagrams discussed below and shown in FIG. 3, any of the operations may be repeated, performed in different orders, and/or performed in parallel with or in a partially overlapping in time manner with other operations. The methods described with respect to FIG. 3 may be performed by a data processing system, and/or another device.

Turning to FIG. 3, a flow diagram illustrating a method for managing a disruption in computer-implemented services provided by data processing systems is shown in accordance with an embodiment. The method may be performed by the system of FIGS. 1A-1B.

At operation 302, log data for a data processing system of the data processing systems may be obtained. The log data may be obtained by (i) reading the log data from storage, (ii) receiving the log data from the data processing system and/or another device, and/or (iii) generating the log data. The log data may be generated, for example, by hardware and/or software components of the data processing system as the data processing system provides its functionality (e.g., computer-implemented services) to its user(s).

The data processing system may be an IoT device, which may be operably connected to a second data processing system as part of a data pipeline. The second data processing system (e.g., an edge device) may be positioned in the data pipeline to obtain data (e.g., log data) generated by the data processing system. For example, log data for the IoT device may be received from the IoT device via the edge device (e.g., operating as a gateway for the IoT device) by a third data processing system participating in the data pipeline.

The log data obtained from the data processing system (e.g., the IoT device) may include log sequences (e.g., one or more log messages that indicate activity of the data processing system during a period of time). The activity may indicate the operational condition of the data processing system. For example, log sequences of log data of a IoT device may indicate whether the IoT device is experiencing (i) normal operating conditions (e.g., known log sequences that may indicate normal operation of the IoT device), (i) undesired operating conditions (e.g., known log sequences that may indicate an operational issue such as a disruption in security and/or functionality of the IoT device), and/or (iii) suspicious operating conditions (e.g., unknown log sequences with unknown indications of IoT device functionality).

Thus, the log data obtained from the data processing system may include descriptions of activity (e.g., log sequences) that may indicate a disruption in the computer-implemented services provided by the data processing system. In order to identify the operational condition of the data processing system (e.g., IoT device), the obtained log data may be analyzed.

At operation 304, the log data may be analyzed using a log sequence model repository to attempt to identify a corresponding log sequence model from the log sequence model repository. The log data may be analyzed by (i) preparing the log data (e.g., to obtain log data attributes of log sequences of the log data), and/or (ii) attempting to identify a log sequence model that corresponds to the log sequences (e.g., based on the log data attributes) from a log sequence model repository.

The log data may be prepared, for example, by performing a normalization process for the log data. The normalization process may include processing steps that standardize different types and/or formats of log data according to a predetermined schema. For example, the log data may include unstructured data, which may be normalized (e.g., cleaned, transformed, etc.) using methods known to those in the art. The log data may also be prepared by performing a data tagging process, which may include extracting and/or adding log data attributes to metadata of the log data. Refer to the discussion of FIG. 2 for more information regarding log data attributes.

The prepared log data may include log sequences (e.g., portions of the log data such as one or more log messages) and associated log data attributes. The prepared log data (and associated attributes) may be stored in prepared log data repository by sending a notification (e.g., including information regarding the prepared lot data such as data size, number of files etc.) to a data processing system that hosts the database managing the prepared log data repository. The prepared log data may be accessed (e.g., via a database query) at a later time (e.g., during operation 310).

The prepared log data may be analyzed, for example, by (i) identifying one or more key words (e.g., based on log data attributes and/or metadata of a log sequence of the prepared data), (ii) using the identified key word(s) to query the database managing data (e.g., log sequence models) stored in the log sequence model repository, and/or (iii) attempting to identify a corresponding log sequence model based on a query result (e.g., corresponding to the log sequence of the prepared data).

The query may return the query result, which may (or may not) include a log sequence model. One or more log data attributes of the log sequence model may match one or more of the log data attributes of the log sequence (of the prepared data). The log data attributes may match one another when the log data attributes are the same and/or similar (e.g., within a threshold). For example, for log data attributes represented by numeric values, two log data attributes (e.g., numeric values) may match if they are within a numeric range of one another (e.g., the numeric range being based on the threshold).

The corresponding log sequence model may be attempted to be identified by selecting the query result. However, the query result may not include a corresponding log sequence model (e.g., the query result may be empty); therefore, no corresponding log sequence model may be identified during the analysis.

One or more steps of the analysis (e.g., log data preparation and/or attempting to identify the log sequence model) may be performed by a third party; therefore, the prepared log data and/or the identified corresponding log sequence model (e.g., or a notification that no corresponding log sequence model was identified) may be received from a data processing system of the third party and/or may be read from storage (e.g., managed by the third party).

At operation 306, a determination may be made regarding whether the corresponding log sequence model is identified. The determination may be made by examining the query result from operation 304. If the query result does not include a corresponding log sequence model, then no corresponding log sequence model is identified during the analysis and the method may proceed to operation 308.

If the query result includes a corresponding log sequence model, then the corresponding log sequence model is identified during the analysis and the method may proceed to operation 314.

At operation 308, in a first instance of the analyzing where no corresponding log sequence model is identified, the log data may be identified as including an unknown sequence of the log messages (e.g., an unknown log sequence). The log data may be identified by sending a notification to an administrator (e.g., via a dashboard adapted to present status information regarding log data of data processing systems) that may include information regarding the unknown log sequence. The information regarding the unknown log sequence may be utilized to identify the log sequence for further analysis. The notification may indicate that a portion of the log data (e.g., the unknown log sequence) is flagged as an unknown log sequence and/or may be a candidate for further analysis.

At operation 310, analysis of the unknown sequence of the log messages (e.g., the unknown log sequence) may be initiated to obtain an update for the log sequence model repository. The analysis may be initiated by receiving the notification (sent as part of operation 308). For example, the notification may be received by a subject matter expert (e.g., directly and/or via the dashboard), and/or the subject matter expert may perform the further analysis of the unknown log sequence.

The further analysis may be performed by querying a database that manages the prepared log data repository using the information regarding the unknown log sequence. The further analysis may include identifying operational attributes associated with the unknown log sequence (e.g., an operational condition and/or a response to the operational condition). Once the operational attributes are identified, the unknown log sequence may cease to be unknown (e.g., by virtue of identifying its operational attributes) and may be referred to as a new log sequence model.

The update (e.g., for the log sequence model repository) may include (i) the new log sequence model, (ii) log data attributes of the new log sequence model (e.g., obtained during the log data preparation process), (iii) the operational condition associated with the new log sequence model, (iv) the response associated with the new log sequence model and/or the operational conditions, and/or (v) information related to the new log sequence model (e.g., data sizes, data identifiers, and/or other metadata).

At operation 312, the update to the log sequence model repository may be deployed. The update may be deployed by (i) notifying a data processing system (e.g., managing the log sequence model repository) of incoming data (e.g., the new log sequence model and associated information) and any information relevant to storing the incoming data (e.g., data sizes, data identifiers, etc.), (ii) transmitting the data to a storage device (e.g., the log sequence model repository), and/or (iii) transforming the data (e.g., into a database format). The notification and/or transmission may be performed via network communications between a data processing system manager and other devices. The data may be stored in the log sequence model repository for later access (e.g., for performing real-time analysis of newly collected log data of data processing systems and/or devices).

The method may end following operation 312.

Returning to operation 306, the method may proceed to operation 314 following operation 306 when the corresponding log sequence model is identified.

At operation 314, in a second instance of the analyzing where the corresponding log sequence model is identified, (additional) instructions based on the corresponding log sequence model may be obtained. The instructions may be obtained by (i) reading the instructions from storage, (ii) receiving the instructions from another device (e.g., a second data processing system operating as a gateway for the data processing system) and/or (iii) generating the instructions. As discussed with respect to FIG. 2, the instructions may include compensatory and/or corrective action.

The instructions may be generated, for example, by examining the operational attributes (e.g., identifying the operational condition and/or response to the operational condition) associated with the corresponding log sequence model. The operational condition may include undesired operation of the data processing system which may cause the disruption in computer-implemented services. The undesired operation of the data processing system may indicate a functionality of the data processing system impacted by the disruption.

The response may specify instructions for remediation of the disruption. For example, the response may include a template for instructions (e.g., for remediation of the disruption) that may be adapted using information regarding the data processing system and/or other data processing systems in the data pipeline (e.g., the second data processing system) such as their identifiers and/or network addresses.

The response to the operational condition may include a template for instructions for implementing a second functionality of the second data processing system (e.g., the edge device operating as a gateway for the data processing system) to correct for the impacted functionality of the data processing system. Therefore, the instructions for compensatory action may include computer instructions readable and/or executable by the second data processing system that may modify the function of the second data processing system in order to correct for the impacted functionality and/or mitigate the disruption in the computer-implemented services.

The response to the operational condition may include a template for instructions for implementing a modification to the impacted functionality of the data processing system. The instructions for corrective action may include computer instructions readable and/or executable by the data processing system that may repair the impacted functionality of the data processing system and/or mitigate the disruption in the computer-implemented services.

The instructions specified by the response may also include updating the dashboard (e.g., adapted to present status information regarding the data processing system to an administrator of the data processing system). The dashboard may be updated by transmitting a notification of the disruption in computer-implemented services to the dashboard. Information included in the notification may be based on the corresponding log sequence model and/or its associated information (e.g., operational attributes and/or log data attributes). For more information regarding the dashboard notification refer to the discussion of FIG. 2.

At operation 316, operation of at least one of the data processing systems may be updated using the (additional) instructions to obtain updated data processing systems that correct for the disruption in the computer-implemented services. The operation may be updated by executing the instructions generated in operation 314. The instructions may be executed automatically by the data processing systems (e.g., the IoT and/or the edge device) and/or via an administrator that is monitoring the dashboard (e.g., for responses to disruptions in computer-implemented services that may include human intervention). Once the instructions are executed, software, configuration settings, etc. may be modified and the data processing systems may be updated.

For example, primary functionality of the edge device may include forwarding data from an IoT device to data processing systems of an edge control plane. However, based on a query of the log sequence model repository, the log data (e.g., log sequences of the IoT device and/or the edge device) may be identified as indicating a disruption in the computer-implemented services provided by the IoT device. The disruption may be due to an undesired operation (e.g., a loss of processing functionality) of the IoT device. For example, the loss of processing functionality may result in incorrectly formatted data being pushed to the edge device (e.g., from the IoT device).

The response associated with the undesired operation may include templates for instructions for corrective and/or compensatory action. For example, the corrective action may include pushing a software update to the IoT device that, upon installation, may restore the lost processing functionality to the updated IoT device. The compensatory action may include modifying the functionality of the edge device (e.g., via software installation, update, and/or reconfiguration) so that the updated edge device may perform the lost processing functionality for the incorrectly formatted data before forwarding correctly formatted data to the data processing system of the edge control plane.

The method may end following operation 316.

Thus, as illustrated above, embodiments disclosed herein may provide systems and methods usable to automate the identification and/or management of disruptions in computer-implemented services provided by data processing systems (e.g., far edge devices such as IoT devices). To do so, the systems and/or methods may automatically obtain and/or analyze log data of data processing systems and/or devices that may be implemented as part of a data pipeline in order to provide the computer-implemented services. The analysis of the log data may be used to identify operational conditions (e.g., undesired operation of the IoT devices) that may cause disruptions in the computer-implemented services. Automated management (e.g., remediation) of the disruptions may include implementing predetermined responses to the identified operational conditions. The predetermined responses may automatically modify the functionality of one or more of the data processing systems included in the data pipeline in order to remediate the disruption. The automated system and method may decrease downtime caused by disruptions in computer-implemented services (e.g., compared to manual methods performed by humans), thereby improving the quality and/or reliability of the computer-implemented services.

Thus, embodiments disclosed herein may provide an improved computing device that is able to automatically extract useful information from log data of data processing systems, usable for automated management purposes. Further, the disclosed process may facilitate identification of relationships between log data and disruptions in computer-implemented services that a human may easily overlook and/or may not identify in a timely manner. Accordingly, the disclosed process provides for both an embodiment in computing technology and an improved method for device management. Rather than relying on a person's intuition or expert knowledge, an automated process for analysis may be provided.

Figure 4:
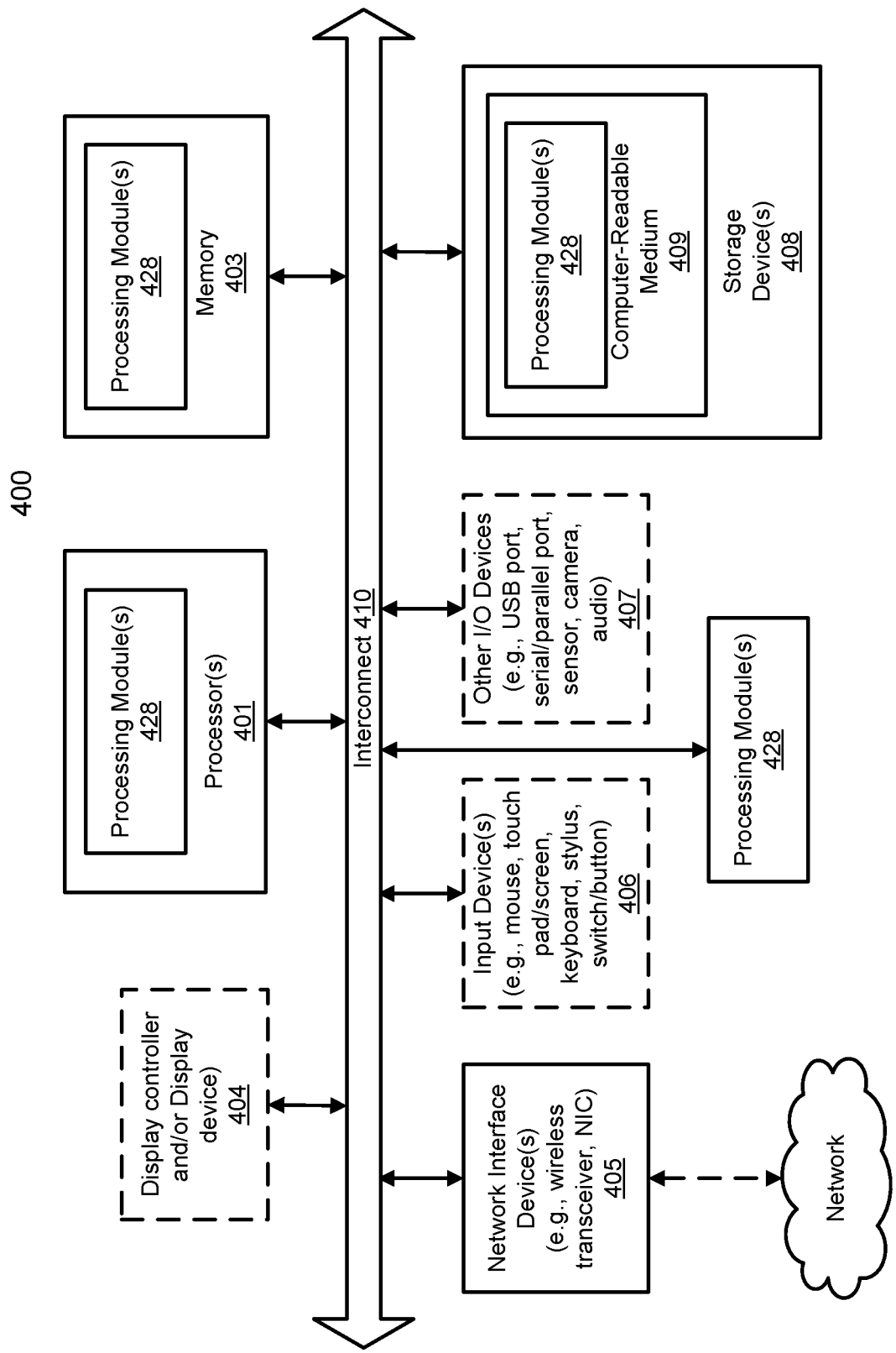
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data processing systems that provide computer-implemented services, comprising:
obtaining log data for a data processing system of the data processing systems, the log data comprising log messages that indicate activity of the data processing system during a period of time, the activity indicating a disruption in the computer-implemented services;
analyzing the log data using a log sequence model repository to attempt to identify a corresponding log sequence model from the log sequence model repository; and
in a first instance of the analyzing where the corresponding log sequence model is identified:
obtaining additional instructions based on the corresponding log sequence model, and
updating operation of at least a second data processing system of the data processing systems using the additional instructions to obtain updated data processing systems that correct for the disruption in the computer-implemented services, the second data processing system being a member of a data pipeline implemented using the data processing system and the second data processing system, and the second data processing system being positioned in the data pipeline to obtain data generated by the data processing system where the data processing system is an internet of things device operably connected to the second data processing system and the second data processing system is an edge device that operates as a gateway for the internet of things device.

2. The method of claim 1, wherein the additional instructions comprise corrective action or compensatory action.

3. The method of claim 2, wherein the corrective action modifies operation of the data processing system to mitigate the disruption in the computer-implemented services.

4. The method of claim 3, wherein the compensatory action modifies operation of the second data processing system to mitigate the disruption in the computer-implemented services.

5. The method of claim 4, wherein the compensatory action comprises:

identifying a functionality of the data processing system impacted by the disruption in the computer-implemented services; and using a second functionality of the second data processing system to correct for the impacted functionality of the data processing system.

6. The method of claim 1, wherein obtaining the additional instructions based on the corresponding log sequence model comprises:

identifying a response associated with the corresponding log sequence model, the response specifying the additional instructions.

7. The method of claim 6, wherein obtaining the additional instructions based on the corresponding log sequence model further comprises:

updating a dashboard based on the corresponding log sequence model, the dashboard being adapted to present status information regarding the data processing systems to an administrator of the data processing systems.

8. The method of claim 1, further comprising:

in a second instance of the analyzing where no corresponding log sequence model is identified:

identifying that the log data comprises an unknown sequence of the log messages, initiating analysis of the unknown sequence of the log messages to obtain an update for the log sequence model repository, and deploying the update to the log sequence model repository.

9. A non-transitory machine-readable medium having instructions stored therein, which when executed by a processor, cause the processor to perform operations for managing data processing systems that provide computer-implemented services, the operations comprising:

obtaining log data for a data processing system of the data processing systems, the log data comprising log messages that indicate activity of the data processing system during a period of time, the activity indicating a disruption in the computer-implemented services;

analyzing the log data using a log sequence model repository to attempt to identify a corresponding log sequence model from the log sequence model repository; and in a first instance of the analyzing where the corresponding log sequence model is identified:

obtaining additional instructions based on the corresponding log sequence model, and updating operation of at least a second data processing system of the data processing systems using the additional instructions to obtain updated data processing systems that correct for the disruption in the computer-implemented services, the second data processing system being a member of a data pipeline implemented using the data processing system and the second data processing system, and the second data processing system being positioned in the data pipeline to obtain data generated by the data processing system where the data processing system is an internet of things device operably connected to the second data processing system and the second data processing system is an edge device that operates as a gateway for the internet of things device.

10. The non-transitory machine-readable medium of claim 9, wherein the additional instructions comprise corrective action or compensatory action.

11. The non-transitory machine-readable medium of claim 10, wherein the corrective action modifies operation of the data processing system to mitigate the disruption in the computer-implemented services.

12. The non-transitory machine-readable medium of claim 11, wherein the compensatory action modifies operation of the second data processing system to mitigate the disruption in the computer-implemented services.

13. The non-transitory machine-readable medium of claim 12, wherein the compensatory action comprises:

identifying a functionality of the data processing system impacted by the disruption in the computer-implemented services; and using a second functionality of the second data processing system to correct for the impacted functionality of the data processing system.

14. The non-transitory machine-readable medium of claim 9, wherein the operations further comprise:

in a second instance of the analyzing where no corresponding log sequence model is identified:

identifying that the log data comprises an unknown sequence of the log messages, initiating analysis of the unknown sequence of the log messages to obtain an update for the log sequence model repository, and deploying the update to the log sequence model repository.

15. A system, comprising:

a processor; and a memory coupled to the processor to store instructions, which when executed by the processor, cause the processor to perform operations for managing data processing systems that provide computer-implemented services, the operations comprising:

obtaining log data for a data processing system of the data processing systems, the log data comprising log messages that indicate activity of the data processing system during a period of time, the activity indicating a disruption in the computer-implemented services, analyzing the log data using a log sequence model repository to attempt to identify a corresponding log sequence model from the log sequence model repository, and in a first instance of the analyzing where the corresponding log sequence model is identified:

obtaining additional instructions based on the corresponding log sequence model; and updating operation of at least a second data processing system of the data processing systems using the additional instructions to obtain updated data processing systems that correct for the disruption in the computer-implemented services, the second data processing system being a member of a data pipeline implemented using the data processing system and the second data processing system, and the second data processing system being positioned in the data pipeline to obtain data generated by the data processing system where the data processing system is an internet of things device operably connected to the second data processing system and the second data processing system is an edge device that operates as a gateway for the internet of things device.

16. The system of claim 15, wherein the additional instructions comprise corrective action or compensatory action.

17. The system of claim 16, wherein the corrective action modifies operation of the data processing system to mitigate the disruption in the computer-implemented services.

18. The system of claim 17, wherein the compensatory action modifies operation of the second data processing system to mitigate the disruption in the computer-implemented services.

19. The system of claim 18, wherein the compensatory action comprises:
- identifying a functionality of the data processing system impacted by the disruption in the computer-implemented services; and
- using a second functionality of the second data processing system to correct for the impacted functionality of the data processing system.

20. The system of claim 15, wherein the operations further comprise:
- in a second instance of the analyzing where no corresponding log sequence model is identified:
  - identifying that the log data comprises an unknown sequence of the log messages,
  - initiating analysis of the unknown sequence of the log messages to obtain an update for the log sequence model repository, and
  - deploying the update to the log sequence model repository.

* * * * *